United States Patent
Baratam et al.

(10) Patent No.: US 9,836,306 B2
(45) Date of Patent: Dec. 5, 2017

(54) PARALLELIZING BOOT OPERATIONS

(71) Applicant: Marvell World Trade Ltd., St. Michael (BB)

(72) Inventors: Vamsi Krishna Baratam, Westborough, MA (US); Tolga Nihat Aytek, Framingham, MA (US)

(73) Assignee: Marvell World Trade Ltd., St. Michael (BB)

( * ) Notice: Subject to any disclaimer, the term of this patent is extended or adjusted under 35 U.S.C. 154(b) by 252 days.

(21) Appl. No.: 14/315,019

(22) Filed: Jun. 25, 2014

(65) Prior Publication Data

US 2015/0039876 A1 Feb. 5, 2015

Related U.S. Application Data

(60) Provisional application No. 61/860,842, filed on Jul. 31, 2013.

(51) Int. Cl.
*G06F 9/44* (2006.01)

(52) U.S. Cl.
CPC .................................. *G06F 9/4401* (2013.01)

(58) Field of Classification Search
None
See application file for complete search history.

(56) References Cited

U.S. PATENT DOCUMENTS

| | | |
|---|---|---|
| 5,155,833 A | 10/1992 | Cullison et al. |
| 5,390,165 A | 2/1995 | Tuch |
| 5,467,398 A | 11/1995 | Pierce et al. |
| 5,469,506 A | 11/1995 | Berson et al. |
| 5,479,514 A | 12/1995 | Klonowski |
| 5,481,733 A | 1/1996 | Douglis et al. |
| 5,617,118 A | 4/1997 | Thompson |
| 5,673,416 A | 9/1997 | Chee et al. |
| 5,696,989 A | 12/1997 | Miura et al. |
| 5,771,356 A | 6/1998 | Leger et al. |
| 5,828,835 A | 10/1998 | Isfeld et al. |
| 5,884,099 A | 3/1999 | Klingelhofer |

(Continued)

FOREIGN PATENT DOCUMENTS

| | | |
|---|---|---|
| CN | 88102647 | 12/1988 |
| CN | 1140272 | 1/1997 |

(Continued)

OTHER PUBLICATIONS

"International Search Report and Written Opinion", Application No. PCT/IB2014/02221, dated Dec. 11, 2014, 8 Pages.

(Continued)

*Primary Examiner* — Kim Huynh
*Assistant Examiner* — Danny Chan (57) ABSTRACT

The present disclosure describes apparatuses and techniques for parallelizing boot operations. In some aspects, an operation transferring a boot image from a non-volatile memory to a volatile memory is initiated prior to completion an operation validating another boot image previously-transferred into the volatile memory. This can be effective to enable transfer operations and validation operations of boot images to be performed in parallel. By so doing, delays between the transfer and validation operations can be minimized thereby reducing device boot times.

20 Claims, 7 Drawing Sheets

(56) References Cited

U.S. PATENT DOCUMENTS

| | | |
|---|---|---|
| 5,991,519 A | 11/1999 | Benhammou et al. |
| 6,006,018 A | 12/1999 | Burnett et al. |
| 6,014,722 A | 1/2000 | Rudin et al. |
| 6,058,188 A | 5/2000 | Chandersekaran et al. |
| 6,092,108 A | 7/2000 | DiPlacido et al. |
| 6,145,069 A | 11/2000 | Dye |
| 6,216,230 B1 | 4/2001 | Rallis et al. |
| 6,230,277 B1 | 5/2001 | Nakaoka et al. |
| 6,330,626 B1 | 12/2001 | Dennin et al. |
| 6,389,538 B1 | 5/2002 | Gruse et al. |
| 6,463,509 B1 | 10/2002 | Teoman et al. |
| 6,473,861 B1 | 10/2002 | Stokes |
| 6,564,318 B1 | 5/2003 | Gharda et al. |
| 6,601,167 B1 | 7/2003 | Gibson et al. |
| 6,678,790 B1 | 1/2004 | Kumar |
| 6,711,447 B1 | 3/2004 | Saeed |
| 6,756,988 B1 | 6/2004 | Wang et al. |
| 6,799,271 B2 | 9/2004 | Kugai |
| 6,823,472 B1 | 11/2004 | DeKoning et al. |
| 6,832,280 B2 | 12/2004 | Malik et al. |
| 6,901,298 B1 | 5/2005 | Govindaraj et al. |
| 7,010,808 B1 | 3/2006 | Leung et al. |
| 7,035,827 B2 | 4/2006 | Ezaki |
| 7,036,018 B2 | 4/2006 | Horvat et al. |
| 7,089,419 B2 | 8/2006 | Foster et al. |
| 7,103,788 B1 | 9/2006 | Souza et al. |
| 7,117,352 B1 | 10/2006 | Giles et al. |
| 7,126,913 B1 | 10/2006 | Patel et al. |
| 7,194,638 B1 | 3/2007 | Larky |
| 7,206,940 B2 | 4/2007 | Evans et al. |
| 7,210,038 B1 | 4/2007 | Walmsley |
| 7,266,842 B2 | 9/2007 | Foster et al. |
| 7,299,365 B2 | 11/2007 | Evans |
| 7,308,591 B2 | 12/2007 | Dubinsky |
| 7,333,464 B2 | 2/2008 | Yang et al. |
| 7,356,707 B2 | 4/2008 | Foster et al. |
| 7,370,349 B2 | 5/2008 | Holvey et al. |
| 7,373,506 B2 | 5/2008 | Asano et al. |
| 7,376,976 B2 | 5/2008 | Fierstein et al. |
| 7,496,952 B2 | 2/2009 | Edwards et al. |
| 7,511,636 B2 | 3/2009 | Takahashi |
| 7,516,325 B2 | 4/2009 | Willey |
| 7,522,726 B2 | 4/2009 | Ishiguro et al. |
| 7,533,253 B2 | 5/2009 | Jo |
| 7,536,558 B2 | 5/2009 | Neble et al. |
| 7,549,056 B2 | 6/2009 | Carr |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,620,784 B2 | 11/2009 | Panabaker |
| 7,676,040 B2 | 3/2010 | Augenstein et al. |
| 7,725,738 B1 | 5/2010 | Langhammer et al. |
| 7,725,818 B1 * | 5/2010 | Krishnan ............... G06Q 40/08 705/2 |
| 7,743,260 B2 | 6/2010 | Fetik |
| 7,774,635 B2 | 8/2010 | Shiota |
| 7,788,670 B2 | 8/2010 | Bodas et al. |
| 7,818,389 B1 | 10/2010 | Chiang et al. |
| 7,835,725 B2 | 11/2010 | Suzuki et al. |
| 7,865,733 B2 | 1/2011 | Goto et al. |
| 7,873,841 B2 | 1/2011 | Mullis, II et al. |
| 7,898,857 B2 | 3/2011 | Kirsch et al. |
| 7,900,060 B2 | 3/2011 | Hodzic |
| 7,991,943 B2 | 8/2011 | Berenbaum et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,094,822 B2 | 1/2012 | Suzuki |
| 8,095,816 B1 | 1/2012 | Chan |
| 8,117,478 B2 | 2/2012 | Liu et al. |
| 8,139,521 B2 | 3/2012 | Mukherjee et al. |
| 8,166,309 B2 | 4/2012 | Muralidharan et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 8,418,242 B2 | 4/2013 | Zhang et al. |
| 8,423,789 B1 | 4/2013 | Poo et al. |
| 8,443,187 B1 | 5/2013 | Orr |
| 8,443,211 B2 | 5/2013 | Zhao et al. |
| 8,483,718 B2 | 7/2013 | Hwang |
| 8,510,560 B1 | 8/2013 | Lambert et al. |
| 8,645,716 B1 | 2/2014 | Dujari et al. |
| 8,688,968 B2 | 4/2014 | Chu et al. |
| 8,694,782 B2 | 4/2014 | Lambert |
| 8,839,016 B2 | 9/2014 | Zhang et al. |
| 8,843,686 B1 | 9/2014 | Chan et al. |
| 9,009,778 B2 | 4/2015 | Pearce et al. |
| 9,141,394 B2 | 9/2015 | Sakarda |
| 9,220,012 B1 | 12/2015 | Inamdar |
| 9,253,175 B1 | 2/2016 | Orr |
| 9,398,455 B2 | 7/2016 | Lambert |
| 9,575,768 B1 | 2/2017 | Kim |
| 2002/0065834 A1 | 5/2002 | Wiggen et al. |
| 2002/0069354 A1 | 6/2002 | Fallon et al. |
| 2002/0087816 A1 | 7/2002 | Atkinson et al. |
| 2002/0103930 A1 | 8/2002 | Kamentsky et al. |
| 2003/0014368 A1 | 1/2003 | Leurig et al. |
| 2003/0188162 A1 | 10/2003 | Candelore et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0015621 A1 | 1/2004 | Tanaka |
| 2004/0030909 A1 | 2/2004 | Sako et al. |
| 2004/0054898 A1 | 3/2004 | Chao et al. |
| 2004/0103272 A1 | 5/2004 | Zimmer et al. |
| 2004/0125679 A1 | 7/2004 | Kwean |
| 2004/0158669 A1 | 8/2004 | Weng et al. |
| 2004/0158708 A1 | 8/2004 | Peyravian et al. |
| 2004/0184343 A1 | 9/2004 | Roohparvar et al. |
| 2004/0187001 A1 | 9/2004 | Bousis |
| 2004/0193875 A1 | 9/2004 | Aura |
| 2004/0250057 A1 | 12/2004 | Fujita et al. |
| 2004/0257462 A1 | 12/2004 | Goris et al. |
| 2004/0266386 A1 | 12/2004 | Kuo |
| 2005/0015602 A1 | 1/2005 | Rees |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0114686 A1 | 5/2005 | Ball et al. |
| 2005/0138365 A1 | 6/2005 | Bellipady et al. |
| 2005/0144468 A1 | 6/2005 | Northcutt et al. |
| 2005/0156925 A1 | 7/2005 | Fong et al. |
| 2005/0177674 A1 | 8/2005 | Ober et al. |
| 2005/0185596 A1 | 8/2005 | Kamentsky et al. |
| 2005/0210290 A1 | 9/2005 | Ono et al. |
| 2005/0278523 A1 | 12/2005 | Fortin et al. |
| 2006/0004946 A1 | 1/2006 | Shah et al. |
| 2006/0036897 A1 | 2/2006 | Lin et al. |
| 2006/0059372 A1 | 3/2006 | Fayar et al. |
| 2006/0072748 A1 | 4/2006 | Buer |
| 2006/0075259 A1 | 4/2006 | Bajikar et al. |
| 2006/0090084 A1 | 4/2006 | Buer |
| 2006/0104243 A1 | 5/2006 | Park |
| 2006/0117177 A1 | 6/2006 | Buer |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2006/0200670 A1 | 9/2006 | Kuffel et al. |
| 2006/0209595 A1 | 9/2006 | Newell |
| 2006/0233149 A1 | 10/2006 | Rustagi et al. |
| 2006/0236198 A1 | 10/2006 | Lintz et al. |
| 2006/0253704 A1 | 11/2006 | Kempf et al. |
| 2006/0253716 A1 | 11/2006 | Dhiman et al. |
| 2006/0259656 A1 | 11/2006 | Sullivan |
| 2006/0285686 A1 | 12/2006 | Van Den Heuvel et al. |
| 2007/0005824 A1 | 1/2007 | Howard |
| 2007/0011445 A1 | 1/2007 | Waltermann et al. |
| 2007/0022469 A1 | 1/2007 | Cooper et al. |
| 2007/0038866 A1 | 2/2007 | Bardsley et al. |
| 2007/0073915 A1 | 3/2007 | Go et al. |

(56) References Cited

U.S. PATENT DOCUMENTS

| | | |
|---|---|---|
| 2007/0097904 A1 | 5/2007 | Mukherjee et al. |
| 2007/0098178 A1 | 5/2007 | Raikar |
| 2007/0118880 A1* | 5/2007 | Mauro, II ............... G06F 21/79 726/4 |
| 2007/0136523 A1 | 6/2007 | Bonella et al. |
| 2007/0136792 A1 | 6/2007 | Ting et al. |
| 2007/0150756 A1 | 6/2007 | Kudelski |
| 2007/0174602 A1* | 7/2007 | Kao ..................... G06F 9/4403 713/2 |
| 2007/0180271 A1 | 8/2007 | Hatakeyama et al. |
| 2007/0186105 A1 | 8/2007 | Bailey et al. |
| 2007/0189249 A1 | 8/2007 | Gurevich et al. |
| 2007/0220501 A1 | 9/2007 | Yanagawa et al. |
| 2007/0234028 A1 | 10/2007 | Rothman et al. |
| 2007/0242643 A1 | 10/2007 | Chandra et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0005549 A1 | 1/2008 | Ke |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0043508 A1 | 2/2008 | Chao et al. |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0082837 A1 | 4/2008 | Mattsson |
| 2008/0084547 A1 | 4/2008 | Tokuda |
| 2008/0091944 A1 | 4/2008 | von Mueller et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0165952 A1 | 7/2008 | Smith et al. |
| 2008/0295157 A1 | 11/2008 | Wong et al. |
| 2008/0298289 A1 | 12/2008 | Jeyaseelan |
| 2008/0313462 A1 | 12/2008 | Zhao et al. |
| 2009/0006658 A1 | 1/2009 | Gough |
| 2009/0024846 A1 | 1/2009 | Ganesan et al. |
| 2009/0049222 A1 | 2/2009 | Lee et al. |
| 2009/0059841 A1 | 3/2009 | Laroia et al. |
| 2009/0077618 A1 | 3/2009 | Pearce et al. |
| 2009/0080389 A1 | 3/2009 | Messerges et al. |
| 2009/0131061 A1 | 5/2009 | Palanki et al. |
| 2009/0187793 A1* | 7/2009 | Dohji ..................... G11C 29/56 714/42 |
| 2009/0199031 A1 | 8/2009 | Zhang |
| 2009/0217043 A1 | 8/2009 | Metke et al. |
| 2009/0222675 A1* | 9/2009 | Lange ..................... G06F 21/64 713/193 |
| 2009/0254771 A1 | 10/2009 | So et al. |
| 2009/0310489 A1* | 12/2009 | Bennett ............... G06F 13/4278 370/236 |
| 2009/0323972 A1 | 12/2009 | Kohno et al. |
| 2009/0327608 A1 | 12/2009 | Eschmann et al. |
| 2010/0023747 A1 | 1/2010 | Asnaashari et al. |
| 2010/0039864 A1 | 2/2010 | Sarin et al. |
| 2010/0058045 A1 | 3/2010 | Borras et al. |
| 2010/0070751 A1 | 3/2010 | Chu |
| 2010/0122017 A1 | 5/2010 | Toyama |
| 2010/0146157 A1* | 6/2010 | Choi ..................... G06F 13/28 710/22 |
| 2010/0174934 A1 | 7/2010 | Zhao |
| 2010/0217935 A1 | 8/2010 | Cho et al. |
| 2011/0039592 A1 | 2/2011 | Haddad et al. |
| 2011/0066837 A1 | 3/2011 | Lee et al. |
| 2011/0211564 A1 | 9/2011 | Yoneyama et al. |
| 2011/0231649 A1 | 9/2011 | Bollay et al. |
| 2011/0231652 A1 | 9/2011 | Bollay et al. |
| 2012/0284517 A1 | 11/2012 | Lambert |
| 2012/0287337 A1 | 11/2012 | Kumar et al. |
| 2013/0031346 A1 | 1/2013 | Sakarda |
| 2013/0046966 A1 | 2/2013 | Chu |
| 2013/0124844 A1 | 5/2013 | Baratam |
| 2013/0246792 A1 | 9/2013 | Lambert |
| 2013/0346777 A1 | 12/2013 | Zhang |
| 2014/0122810 A1* | 5/2014 | Bhoria ............... G06F 12/0891 711/144 |
| 2014/0189340 A1* | 7/2014 | Hadley .................. G06F 21/54 713/2 |
| 2014/0258724 A1 | 9/2014 | Lambert et al. |
| 2015/0071438 A1 | 3/2015 | Lambert |

FOREIGN PATENT DOCUMENTS

| | | |
|---|---|---|
| CN | 101097522 | 1/2008 |
| CN | 102272734 | 9/2014 |
| EP | 1847911 | 10/2007 |
| GB | 2407239 | 4/2005 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 2006285738 | 10/2006 |
| JP | 5565778 | 6/2014 |
| WO | WO-2013019423 | 2/2013 |
| WO | WO-2013074797 | 5/2013 |

OTHER PUBLICATIONS

"Notice of Allowance", U.S. Appl. No. 14/147,087, dated Sep. 12, 2016, 5 pages.

"Corrected Notice of Allowance", U.S. Appl. No. 14/147,087, dated Jan. 27, 2017, 2 pages.

* cited by examiner

PARALLELIZING BOOT OPERATIONS

CROSS REFERENCE TO RELATED APPLICATION

This present disclosure claims priority to U.S. Provisional Patent Application Ser. No. 61/860,842 filed Jul. 31, 2013, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing and electronic devices often execute an operating system or applications to implement functionalities of the device. The operating system or applications of a device, however, are unable to execute until boot code is used to configure and boot the device for operation. When booting a device, portions of the boot code are copied from a non-volatile memory of the device in the form of boot images. Each of the boot images is typically copied to a volatile memory of the device for validation or other boot operations before a next boot image is copied from the non-volatile memory. Waiting for a processor to complete validation or other boot operations for each boot image, however, can delay the loading of other boot images and introduce significant delays into the boot process.

SUMMARY

The details of one or more implementations are set forth in the accompanying drawings and the description below. Other features and advantages will be apparent from the description and drawings. As such, this Summary should not be considered to describe essential features nor used to limit the scope of the claimed subject matter.

A method is described for initiating, via a direct memory access (DMA) controller, a first transfer operation of a first boot image from a first memory into a second memory. After completion of the first transfer operation, the method then initiates a validation operation of the first boot image in the first memory to verify that the first boot image is secure. Prior to completion of the validation operation, a second transfer operation is initiated to transfer a second boot image from the first memory into the second memory.

Another method is described for retrieving a header image from a non-volatile memory that stores multiple boot images, which are described by the header image. The method then constructs, based on the header images, a structure and descriptors that describe source locations of the multiple boot images and destination locations of the multiple boot images in a volatile memory. The structure and descriptors are then issued effective to cause a memory controller to transfer at least one of multiple boot images into the volatile memory while a processor validates a previously-transferred one of the multiple boot images.

A System-on-Chip is described that includes a boot manager that is configured to implement parallel boot operations. In some aspects, the boot manager initiates, via a memory controller, a first direct memory access (DMA) transfer operation that transfers a first of the multiple boot images from a non-volatile memory to a volatile memory. After completion of the first DMA transfer operation, the boot manager causes a processor to initiate a validation operation to validate the first boot image in the volatile memory. Prior to completion of the validation operation, the boot manager initiates a second DMA transfer operation that transfers a second of the multiple boot images from the non-volatile memory to the volatile memory.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for loading boot images sequentially transfer each boot image after a previously-transferred boot image is validated. For example, once a memory controller has transferred a boot image into volatile memory, the memory controller waits until a processor has validated the boot image before starting a transfer of a next boot image. Further, boot images are typically large in size due to the complex nature of devices, which results in validation operations for each boot image consuming a considerable number of processing cycles and time. This not only delays the transfer and validation of each subsequent boot image, but has a cumulative effect of significantly slowing an entire boot up sequence.

This disclosure describes apparatuses and techniques for parallelizing boot operations, which enable boot images to be transferred into volatile memory while other boot images are being validated. Once a boot image is transferred from non-volatile memory into volatile memory, validation of the boot image and transfer of a next boot image are performed in substantially concurrent fashion. By so doing, subsequent boot images can be transferred without waiting for validations of previously-transferred boot images to complete. This can be effective to reduce delays in the boot process and reduce an overall boot time of a device by as much as 40 percent to 50 percent.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
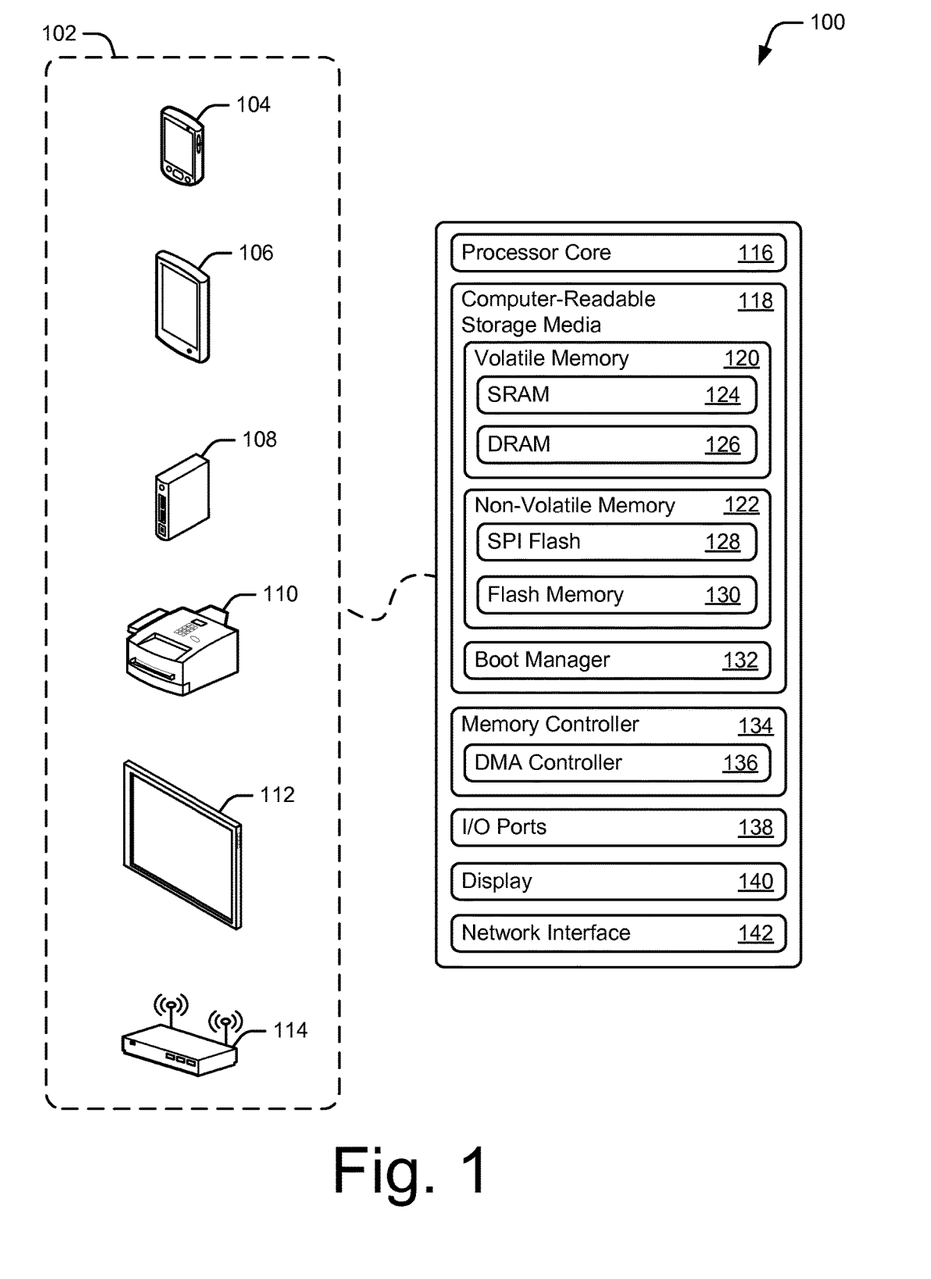
FIG. 1 illustrates an operating environment having computing devices in accordance with one or more aspects.

FIG. 1 illustrates an example of an operating environment 100 having computing devices 102, each of which are capable of communicating, accessing, presenting, or processing various data. Computing devices 102 include smartphone 104, tablet computer 106, network-attached storage (NAS) device 108, multi-function printer 110, internet-protocol enabled television 112 (IP TV 112), and wireless router 114. Although not shown, other configurations of computing devices 102 are also contemplated such as a desktop computer, server, mobile-internet device (MID), camera, personal navigation device, set-top box, netbook, ultra-book, gaming console, appliances, mobile hotspot, networked media player, and so on.

Generally, computing devices 102 have operational states ranging from an "off" state to an "on" state. These states may include a fully off state (mechanical off), suspend state, sleep state, hibernation state, idle state, active state, and the like. When transitioning from a lower operational state to a higher operational state (e.g., from an off state to an active state), computing device 102 is booted. Booting computing device 102 includes executing low-level code (e.g., boot code) to configure components of computing device 102 for operation and control by higher-level software, such as firmware, operating system, or applications.

Each computing device 102 includes processor core 116 (e.g. an application processor core) and computer-readable storage media 118 (CRM 118). Although shown as a single core, processor core 116 may be one of any suitable number and/or type of processing cores, which may be configured in any suitable manner (e.g., a heterogeneous multi-core application processor). CRM 118 includes volatile memory 120 and non-volatile memory 122, which may include any suitable type, combination, or number of memory media or devices. Note, that CRM 118 are implemented at least partially in hardware or physical devices that are configured to store data (e.g., digital or analog values) and do not include transitory signals or carrier waves.

In this particular example, volatile memory 120 includes static random access memory 124 (SRAM 124) and synchronous dynamic random-access memory 126 (DRAM 126). Alternately or additionally, volatile memory 120 may include other suitable types of memory, such as random-access memory (RAM), asynchronous dynamic RAM, double-data-rate RAM (DDR), and the like.

Non-volatile memory 122 includes serial-peripheral interface (SPI) Flash 128 and Flash memory 130, which may be configured in any suitable way, such as standalone NAND Flash memory or an embedded multimedia card (eMMC) device comprising Flash memory, memory interface, and embedded memory controller. Other non-volatile memories contemplated include non-volatile RAM (NVRAM), read-only memory (ROM), electronically-erasable programmable ROM (EEPROM), NOR Flash, single-level cell (SLC) Flash, multi-level cell (MLC) Flash, and the like.

Non-volatile memory 122 stores data of computing device 102 persistently when powered-down or suspended. Boot code of computing device 102 can be stored in one or more non-volatile memory components, such as SPI Flash 128 and Flash memory 130. In some cases, the boot code of computing device 102 is stored as boot images that are individually addressable and transferable. Operating systems, applications, or user data (not shown) of computing device 102 may be stored by, or executed from, volatile memory 120, non-volatile memory 122, or any suitable combination thereof. Alternately or additionally, operating systems and/or applications of computing device 102 may be embodied as firmware or other processor-executable instructions, binaries, or code. These operating systems and applications of computing device 102 are executable by processor core 116 to provide a user interface, various functionalities, applications, or services of computing device 102.

CRM 118 also contains boot manager 132, which in this particular example, is embodied as processor-executable instructions that are executable by processor core 116 to implement various functionalities. Alternately or additionally, boot manager 132 may be implemented, in part or whole, via firmware or hardware (not shown) or any suitable combination thereof. Boot manager 132 may enable concurrent transfers of boot images from non-volatile memory 122 to volatile memory 120 and validations of boot images in volatile memory 120. The implementation and use of boot manager 132 varies and is described below.

Computing device 102 also includes memory controller 134 that enables data to be transferred, copied, or otherwise moved between various memory locations. Memory controller 134 may be implemented as any suitable type of memory controller, such as a Flash memory controller, secure digital (SD) controller, SD input/output (SDIO) controller, SD combo controller, multimedia card (MMC) controller, SD host controller (SDHC), and the like. Alternately or additionally, memory controller 134 may be implemented separate from or integrated with CRM 118 or a memory thereof. Memory controller 134 also includes direct memory access (DMA) controller 136, which enables DMA transfer operations between various memories of computing device 102, such as Flash memory 130 and DRAM 126.

Generally, a DMA transfer operation, once initiated, is able to move data between memory locations without involving a processor (e.g., processor core 116) or other higher-level controller. These DMA operations may include single operation DMA algorithms or advanced DMA (ADMA) operations, such as scatter gather ADMA algorithms, which are described in version 2.0 and later revisions of the SD Host Controller specification. Note that memory controllers described herein may support any suitable type of ADMA operation, such as ADMA1 for transfers up to 4 KB or ADMA2 for transfers of data at any size or location. Alternate or additional aspects of ADMA transfer operations are also described in version 4.5 and later revisions of the Joint Electron Device Engineering Council (JEDEC) Embedded Multimedia Card (eMMC) standard.

The ADMA transfer algorithm is a scatter gather algorithm and operates via a set of transfer and link descriptors. The descriptors may be organized by a descriptor table (not shown), which may be programmed with descriptors describing a series of data transfers between Flash memory 130 and other memories of computing device 102. The descriptors may be executed from the descriptor table without interrupting software executing on processor core 116 (e.g., a memory host driver). Memory controller 134 and DMA controller 136 may also support various boot modes, such as an alternate boot mode capable of implementing ADMA transfers. Accordingly, boot manager 132 may be configured to construct ADMA descriptors effective to cause DMA controller 136 to transfer boot images from non-volatile memory 122 to volatile memory 120 when computing device 102 is booted. Alternately or additionally, descriptors can be configured to trigger interrupts when execution of the descriptor completes or at the end of a transfer operation on a data bus.

Computing device 102 may also include I/O ports 138, display 140, or network interface(s) 142. I/O ports 138 allow computing device 102 to interact with other devices or users. I/O ports 138 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with I/O ports 138, such as human-input devices (HIDs), external computer-readable storage media, or other peripherals.

Display 140 may present a user interface or rendered graphics associated with an operating system or application of computing device 102. Display 140 may include a touch-input sensor (not shown), such as a touch screen or touch-sensitive overlay. Network interface 142 provides connectivity to one or more networks and other devices connected therewith. Data communicated over network interface 142 may be packetized or framed depending on a communication protocol or standard by which computing device 102 is communicating. Network interfaces 142 may include wired interfaces, such as Ethernet or fiber optic interfaces for communication over a local network, intranet, or the Internet. Network interfaces 142 may also include wireless interfaces that facilitate communication over wireless networks, such as wireless LANs, cellular networks, or wireless personal-area-networks (WPANs).

Figure 2:
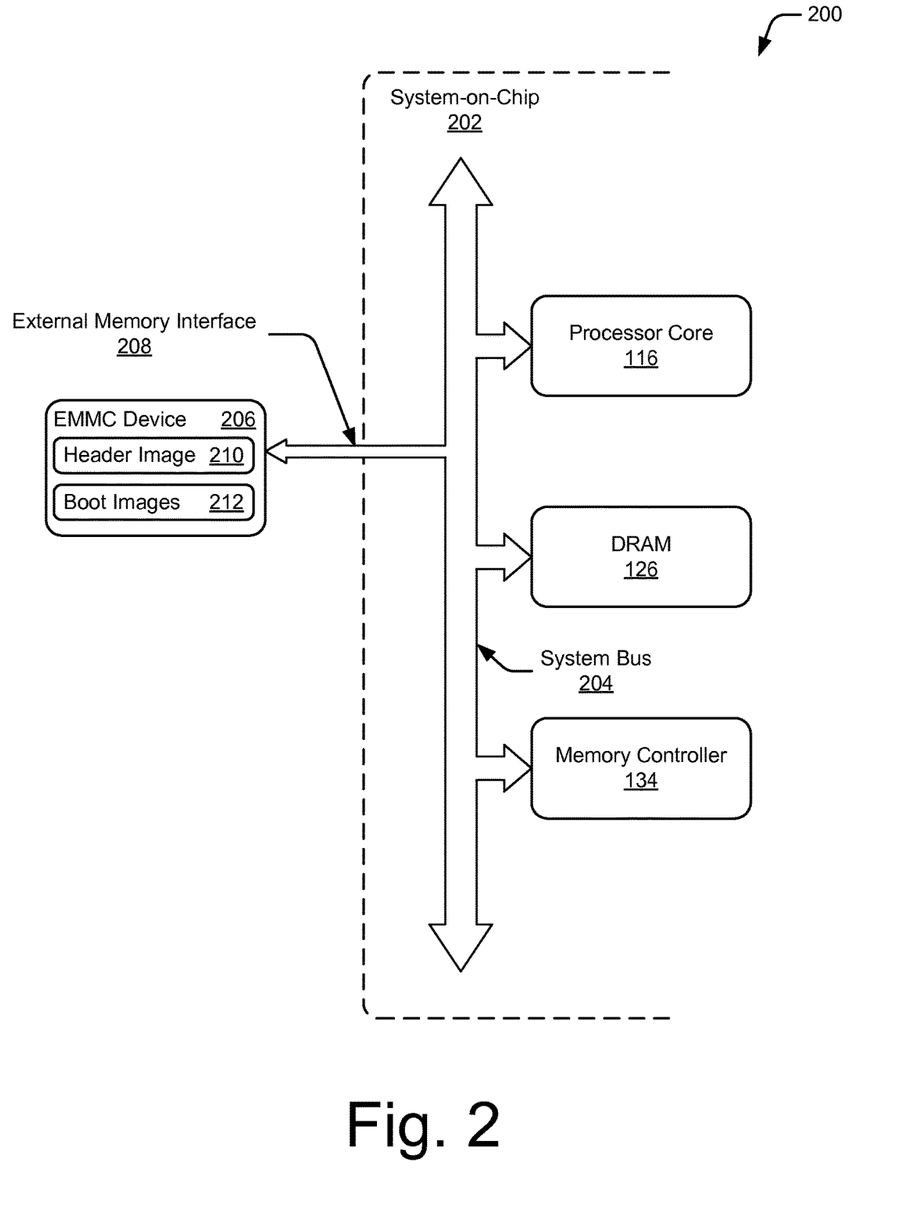
FIG. 2 illustrates an example system architecture in accordance with one or more aspects.

FIG. 2 illustrates an example system architecture of a computing device 102 generally at 200. In this particular example, some components of computing device 102 are illustrated as being implemented as part of System-on-Chip 202 (SoC 202), such as processor core 116, DRAM 126, and memory controller 134. These and other components of SoC 202 communicate via system bus 204, which may be configured as a data bus, memory bus, system crossbar, interconnect fabric, or any combination thereof. In some cases, system bus 204 is implemented as an Advanced eXtensible Interface (AXI) bus, Advanced High Performance Bus (AHB), or Open Core Protocol (OCP) bus.

System architecture 200 also includes an external memory in the form of embedded multimedia card (eMMC) device 206, which communicates with SoC 202 via external memory interface 208. EMMC device 206 includes header image 210 and boot images 212, which are useful to boot and configure components of SoC 202 for operation and control by a higher-level operating system. Generally, boot images are transferred from eMMC device 206 to DRAM 126 via system bus 204 when computing device 102 is booted. EMMC device 206 may also include an internal memory controller and data interface (not shown) that enable communication over external memory interface 208.

Header image 210 includes information describing locations, destinations, or sizes of boot images 212 that are part of a boot process for computing device 102. In some cases, header image 210 is located at a predefined or default address within eMMC device 206 that is accessed when computing device 102 boots. When computing device 102 implements a secure boot process, a security or authenticity of header image 210 and boot images 212 is determined before code of the images is executed by processor core 116, memory controller 134, or other components of computing device 102. In some cases, a hash value for a boot image is generated by a processor and then compared with a predefined hash reference value to verify the security of the boot image.

The information of header image 210 can be useful to construct commands and transfer descriptors (e.g., ADMA descriptors) for loading boot images into volatile memory for validation or execution. In some cases, groups of commands are assembled to form a packed command structure, which can be sent to a memory controller to enable multiple data transfers. For example, information describing respective sizes and locations of boot images in a flash memory can be used to construct a packed command structure (e.g., read_multiple_block commands) that is configured to cause the boot images to be read or streamed from the flash memory. Note here that execution of the packed command structure is treated as a single transfer operation rather than a series of individual transfers. The packed commands described herein can be implemented in accordance with version 4.5 and later revisions of the JEDEC eMMC standard.

Alternately or additionally, information describing respective sizes and destinations of boot images can be used to construct multiple descriptors (e.g., ADMA descriptors) for transferring the boot images into non-volatile memory. Transfer descriptors typically include a destination address, a length indicator specifying an amount of data to transfer, and various attribute fields (e.g., descriptor type, validity, end, interrupt action). In some cases, the descriptors are configured to trigger an interrupt in response to execution of the respective descriptors or in response to completion of a data transfer. These interrupts can be useful to signal or synchronize other boot operations performed by various entities, such as initiating validation operations once a boot image is loaded into volatile memory.

Techniques of Parallelizing Boot Operations

The following discussion describes techniques of parallelizing boot operations. These techniques can be implemented using the previously described environment or entities, such as boot manager 132, memory controller 134, or DMA controller 136 of FIG. 1 embodied on a computing device 102. These techniques include methods illustrated in FIGS. 3, 5, and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2 and 4 by way of example. Such reference is not to be taken as limited to operating environment 100 but rather as illustrative of one of a variety of examples.

Figure 3:
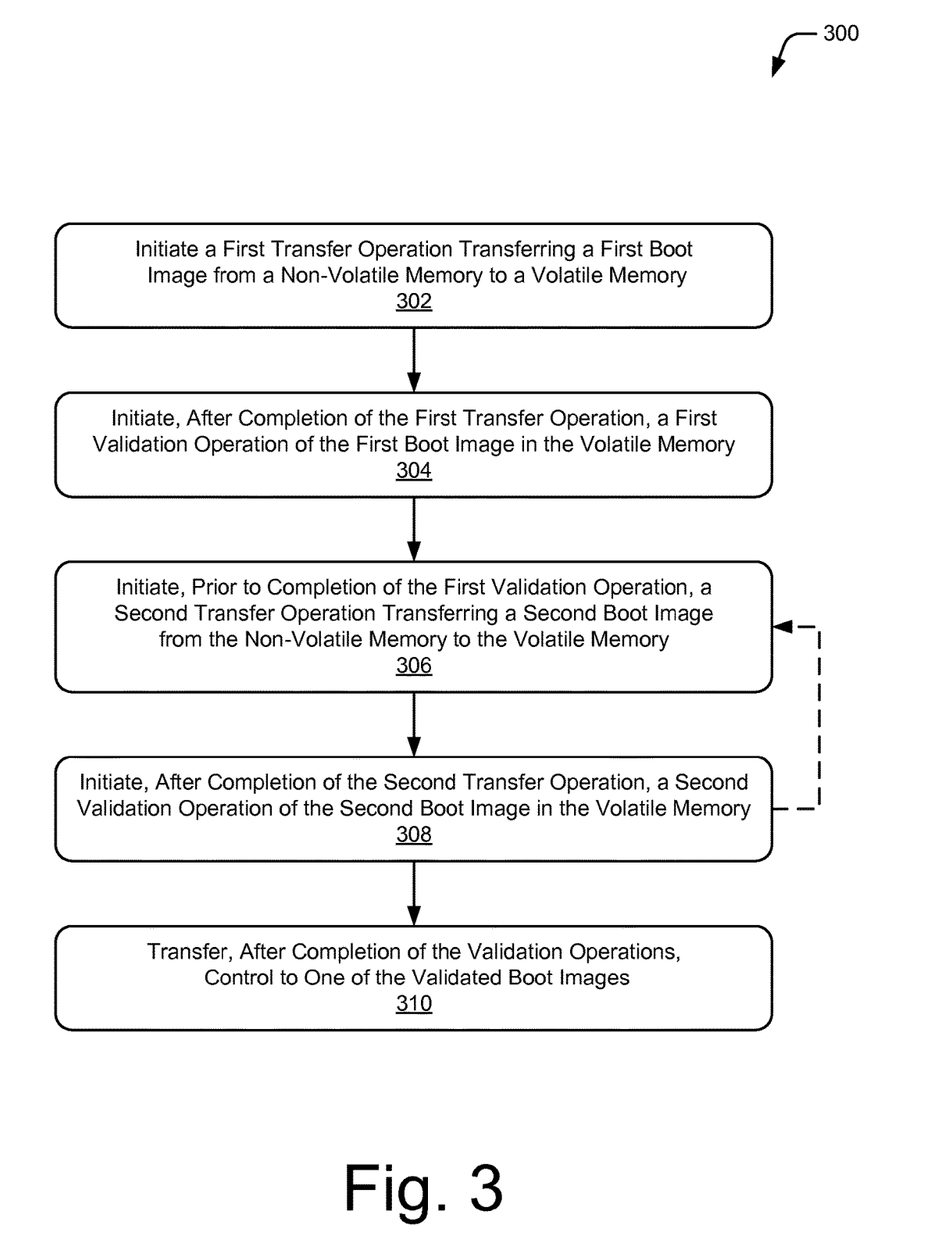
FIG. 3 illustrates a method for initiating parallel transfer and validation operations during a boot sequence.

FIG. 3 depicts a method 300 for initiating parallel transfer and validation operations during a boot sequence, including operations performed by boot manager 132 of FIG. 1.

At 302, a first transfer operation is initiated to transfer a first boot image from a non-volatile memory of a device. The first transfer operation transfers the first boot image to a volatile memory of the device. The first boot image may include any suitable amount of data, such as multiple blocks or pages of boot code or binaries. In some cases, the non-volatile memory includes a header image describing the first and other boot images. In such cases, the transfer operation can be initiated based on information included in the header image, such as a location, destination, or size of the first boot image.

The first transfer operation may be a DMA transfer implemented by a DMA-enabled memory controller executing descriptors to copy the first boot image from the non-volatile memory. In some cases, the DMA transfer is initiated by setting up the transfer or other commands, and may include configuring a DMA command or transfer descriptor that specifies the non-volatile memory as a source of the first boot image and the volatile memory as a destination. Alternately or additionally, the first boot image may be read from the non-volatile memory in response to execution of a packed command sequence by a memory controller associated with the non-volatile memory.

As an example, consider a user powering-on IP TV 112 of FIG. 1. Assume here that IP TV 112 is transitioning to an "on" state from an "off" state in which power was removed from DRAM 126 and other various components of IP TV 112. In the context of this example, also assume that IP TV 112 is configured similar to the system architecture of FIG. 2 in which the boot images 212 are stored by eMMC device 206. Here, boot manager 132 constructs, based on header image 210, transfer descriptors and packed commands to enable the transfer of boot images 212 from eMMC device 206 to DRAM 126. Boot manager 132 then issues the transfer descriptors and packed commands to memory controller 134 and eMMC device 206, respectively.

Figure 4:
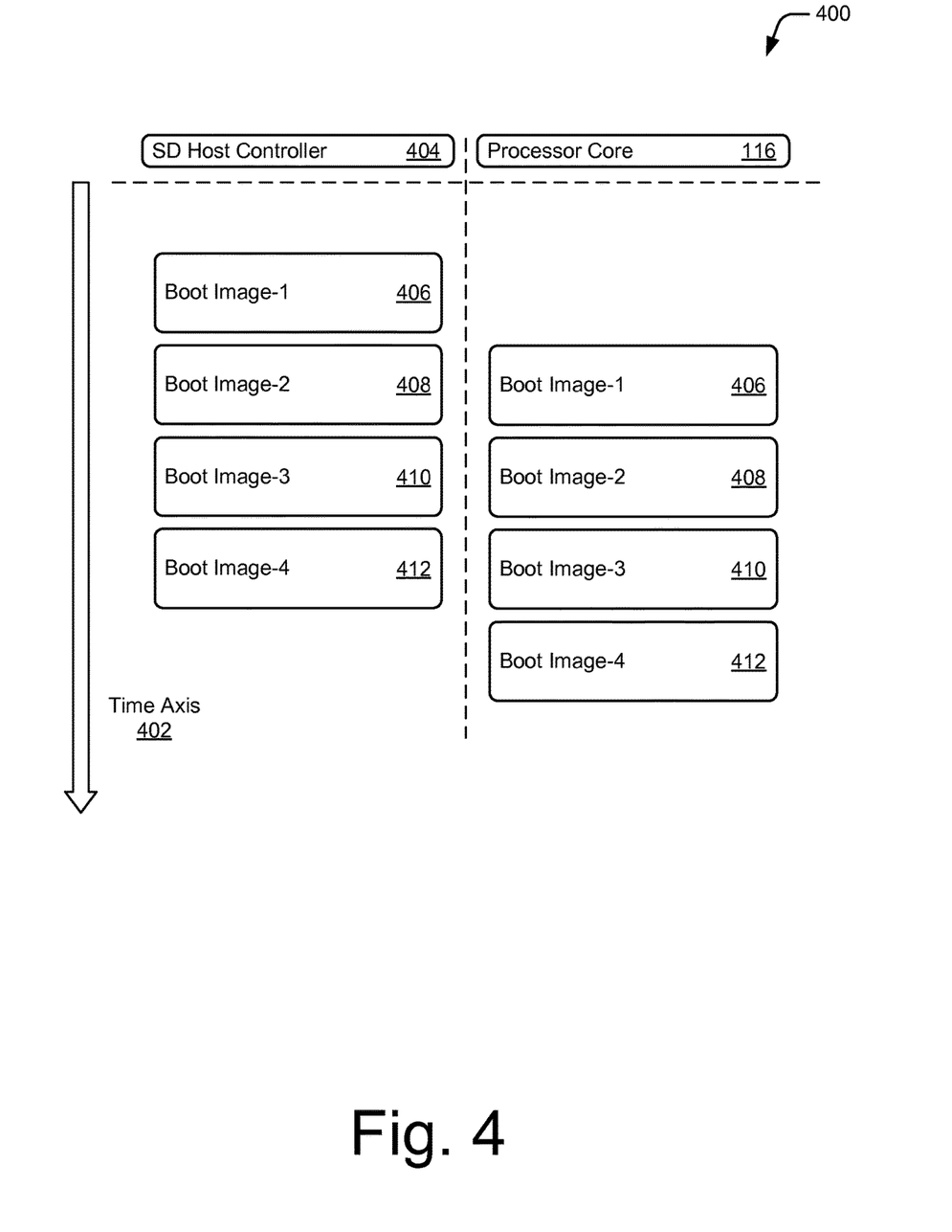
FIG. 4 illustrates an example boot image loading sequence in accordance with one or more aspects.

In response to executing the transfer descriptor, memory controller 134 initiates a DMA transfer of the first boot image into DRAM 126. FIG. 4. illustrates temporal aspects of this and other boot operations performed in association with volatile memory (e.g., DRAM 126) generally at 400 and with respect to time axis 402. Additionally, entities that are capable of performing each boot operation are shown above each of the various boot operations. In this example, processor core 116 performs validation operations and a memory controller, which is illustrated as SD host controller 404, transfers the boot images into DRAM 126 from eMMC device 206.

Returning to the context of operation 302, eMMC device 206 reads boot image-1 406 from internal flash in response to executing one of the packed commands. SD host controller 404 then loads boot image-1 406 into DRAM 126 via a DMA transfer operation in response to executing a transfer descriptor. By so doing, involvement of processor core 116 is unnecessary during the transfer of boot image-1 406 into DRAM 126.

At 304, a first validation operation for the first boot image is initiated once the transfer of the first boot image into the volatile memory is complete. The validation operation is performed to ensure security or authenticity of the first boot image or contents thereof. In some cases, a processor generates a hash value or checksum based on the contents of the first boot image. The generated hash value or checksum is then compared with a predetermined reference value to verify that the content of the boot image are unaltered or authentic. Alternately or additionally, the validation operation can be initiated in response to an indication that the first boot image is loaded into the non-volatile memory. For example, a memory controller may trigger an interrupt on completion of the transfer of the first boot image or in response to execution of a descriptor associated therewith.

In the context of the present example, a DMA interrupt is triggered at the end of the transfer descriptor's execution by SD host controller 404. Responsive to the DMA interrupt, boot manager 132 signals processor core 116 to start validating boot image-1 406 in DRAM 126. Here, processor core 116 generates a hash value for boot image-1 406 that, when complete, is compared with a predefined reference value to determine the security of boot image-1 406.

At 306, a second transfer operation is initiated to transfer a second boot image from the non-volatile memory of the device. The second transfer operation transfers the second boot image to the volatile memory of the device. As with the first boot image, the second boot image may include any suitable amount of data, such as multiple blocks or pages of the boot code or binaries. In some cases, the first and the second boot images are stored in a same partition of the non-volatile memory. Additionally, the transfer operation can be initiated based on information included in the header image, such as a location, destination, or size of the second boot image.

The second transfer operation may be implemented in similar fashion to the first transfer operation of the first boot image, the details of which are described above and elsewhere herein. For example, the second transfer operation can be a DMA transfer implemented by a DMA-enabled memory controller executing descriptors and a non-volatile memory device executing a packed command sequence. By so doing, the second boot image can be transferred into the volatile memory of the device without involving other entities, such as a processor core that is performing other operations.

Continuing the ongoing example, eMMC device 206 reads boot image-2 408 from internal flash in response to executing another one of the packed commands. SD host controller 404 then loads boot image-2 408 into DRAM 126 via another DMA transfer operation in response to executing another transfer descriptor. As illustrated in FIG. 4, boot image-2 408 is loaded into DRAM 126 while processor core 116 validates boot image-1 406. Alternately or additionally, sizes of each boot image may differ, which can result associated boot operations consuming differing amounts of time.

As noted with respect to operation 302, boot manager 132 can issue the packed commands and transfer descriptors at a start of the boot sequence. Execution of the respective packed commands or respective transfer descriptors can then continue throughout the boot sequence with little or no involvement from a processor or other higher-level controller. This can be effective to permit processor core 116 to perform validation operations on previously-transferred boot images while a next boot image is loaded into DRAM 126.

At 308, a second validation operation for the second boot image is initiated once the transfer of the second boot image into the volatile memory is complete. The validation operation is performed to ensure security or authenticity of the second boot image or contents thereof. The second validation operation may be implemented in similar fashion to the first validation operation of the first boot image, the details of which are described above and elsewhere herein. In the context of the present example, another DMA interrupt is triggered at the end of the other transfer descriptor's execution by SD host controller 404. Responsive to the other DMA interrupt, boot manager 132 signals processor core 116 to start validating boot image-2 408 in DRAM 126. Here, processor core 116 generates a hash value for boot image-2 408 that, when complete, is compared with a predefined reference value to determine the security of boot image-2 408.

From operation 308, method 300 may return to operation 306 to initiate transfer of an additional boot image from the non-volatile memory of the device. Note that because operations 306 and 308 may be initiated in approximately concurrent fashion, method 300 may initiate the transfer of the additional boot image while a previously-transferred boot image is being validated. In some cases, transfer of a second boot image may complete before validation of a first boot image, such as when a first boot image (or any previously-transferred image) is larger than a second boot image. In these cases, a memory controller may initiate transfer of a third boot image without waiting for the validation of the first boot image to complete, which is effective to prevent validation operations from delaying any of the transfer operations. In the ongoing example, boot manager 132 initiates a transfer of boot image-3 410 from non-volatile memory and initiates validation of boot image-2 408. Boot manager 132 may then continue performing operations of method 300 to transfer and validate boot image-3 410 and boot image-4 412 as shown in FIG. 4.

At 310, control of the device is transferred to an executing boot image. In some cases, control is transferred from a first executing boot image to a next executing boot image until control is transferred to an operating system of the device. By validating each successive boot image, a chain of trust is established throughout the boot process to ensure that unauthorized or malicious code, operating systems, or applications are prevented from executing on the device. Concluding the present example, boot manager 132 transfers control of the device to an operating system of IP TV 112 in response successfully validating and initiating execution of boot image-4.

Figure 5:
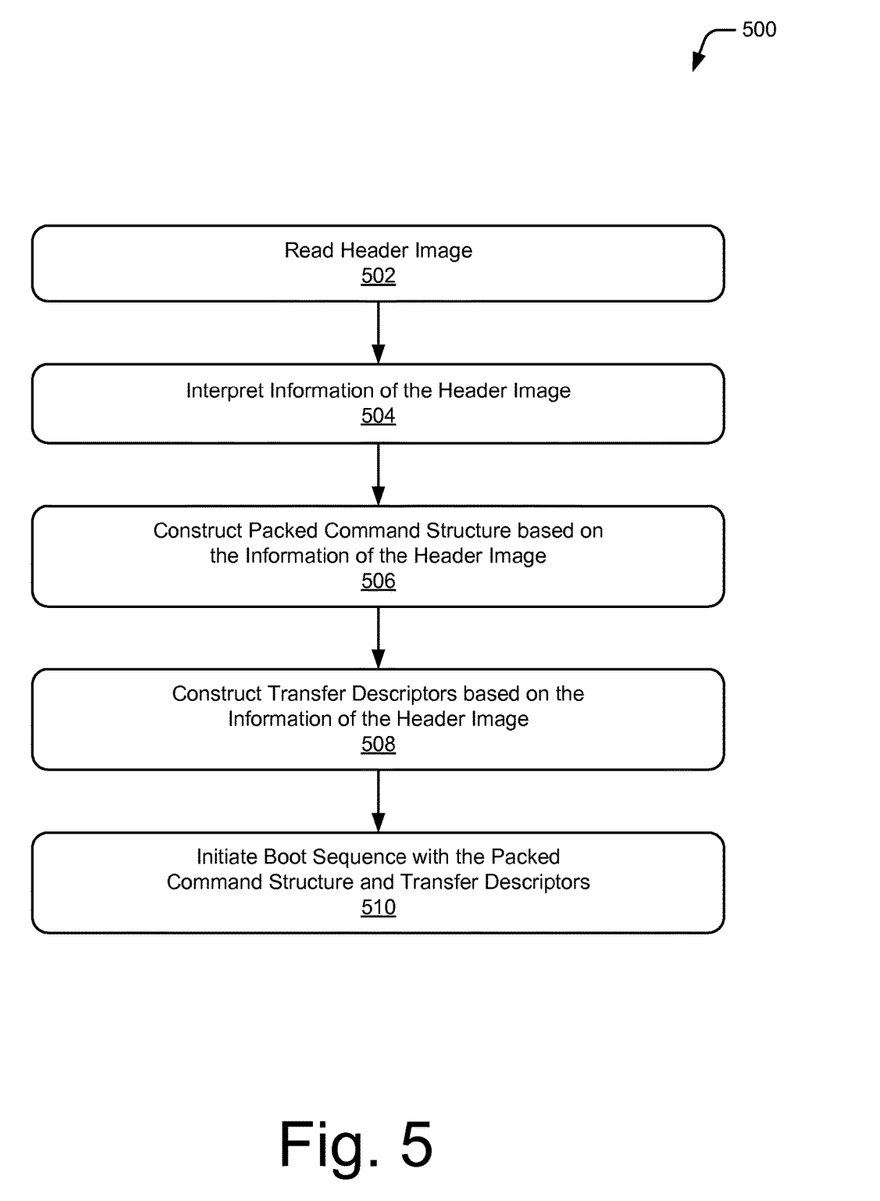
FIG. 5 illustrates a method for constructing a command structure and transfer descriptors to enable parallel boot operations.

FIG. 5 depicts a method 500 for constructing a command structure and transfer descriptors to enable parallel boot operations, including operations performed by boot manager 132 of FIG. 1.

At 502, a header image is read from a boot partition of a non-volatile memory. The header image can be located at a default location or address that is accessed in response to a device booting up. In some cases, a processor or controller of the device is configured to access the non-volatile memory, and the boot partition thereof, by default to boot the device. The header image may also be validated to ensure security or authenticity of the header image. Alternately or additionally, the header image may have a signature indicating that the header image is a first boot image of the boot partition.

At 504, the header image is interpreted to extract information that describes other boot images stored in the non-volatile memory. This information may include a location, destination, or size for each of the other boot images. For example, the information of the header image may indicate an address of a boot image in the non-volatile memory, a destination for the boot image in a volatile memory of the device, and a size of the boot image. This information describing the boot images is useful to transfer the boot images from the non-volatile memory during a boot process of the device.

At 506, a packed command structure is constructed based on the information of the header image. By using a SET_BLOCK_COUNT command (CMD23) with a PACKED flag set and a block count of one, the packed command structure may include multiple read commands configured to transfer the boot images from the non-volatile memory. A WRITE_MULTIPLE_BLOCK command (CMD 25) can follow the block command with a header, which is followed by multiple READ_MULTIPLE_BLOCK commands (CMD18) to read the boot images. Issuing the packed command structure (e.g., to an eMMC device) at the start of a boot sequence may enable multiple data transfers to be initiated over an SD bus without issuing individual read commands. This can be effective to reduce command overhead on the SD bus and reduce delays associated with boot image transfers.

At 508, transfer descriptors are constructed based on the information of the header image. The transfer descriptors can be ADMA2 descriptors configured for execution by an SD host controller. Similar to the packed command structure, the transfer descriptors enable a memory controller (e.g., SD host controller) to treat the transfer of the boot images as one large transfer, rather than several individual transfers.

The descriptors may also be configured to trigger different types of interrupts, such as interrupts triggered at an end of a descriptors execution (e.g., DMA interrupts) or when an entire transfer of a boot image is complete (e.g., last descriptor in a chain). Interrupts that trigger in response to complete execution of a transfer descriptor can be used to signal a processor or higher-level software to begin validation operations on a boot image transferred by the transfer descriptor. Note that for boot images spanning two or more transfer descriptors, the interrupt is configured to trigger when a last of the transfer descriptors executes for that boot image. Setting a "last descriptor" attribute of the last descriptor triggers a transfer complete interrupt that notifies the processor that the transfers on the bus are complete.

At 510, a boot sequence of the device is initiated using the packed command structure and the transfer descriptors. In some cases, this includes issuing the packed command structure to a memory controller integrated with the non-volatile memory and issuing the transfer descriptors to a system level memory controller. By so doing, transfer operations of the boot process can be performed in parallel with validation operations performed by a processor, which can significantly reduce delays in the boot sequence and improve device boot times.

Figure 6:
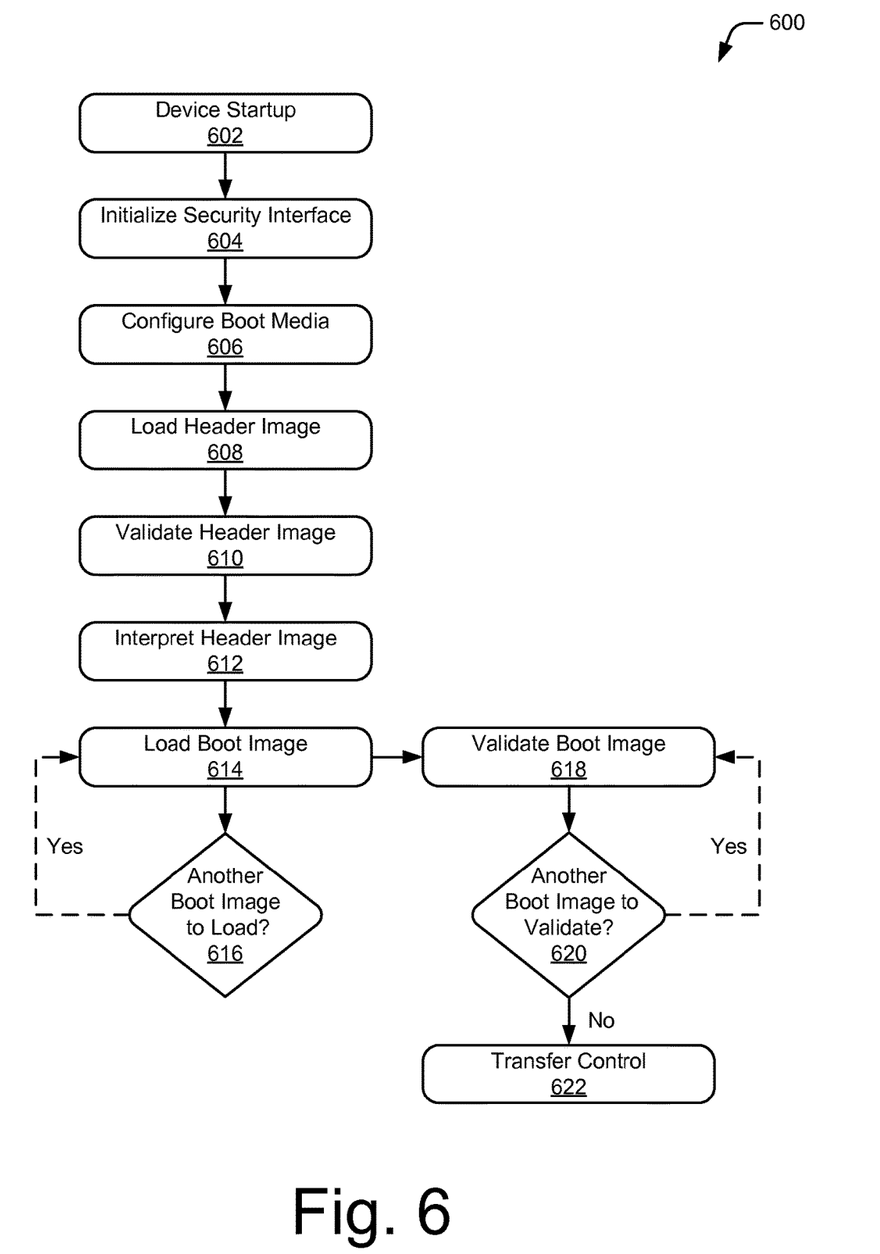
FIG. 6 illustrates a method of booting a computing device with parallelized boot operations.

FIG. 6 depicts a method 600 of booting a computing device with parallelized boot operations, including operations performed by boot manager 132 and processor core 116 of FIG. 1.

At 602, an electronic or computing device is started. Starting the device initiates a boot process during which components of the device are initialized and configured for use. The device may start responsive to a user input (e.g., power button), power event, alarm, timer, and the like.

At 604, a security interface of the device is initialized. The security interface is configured to ensure the boot operations and other functionalities of the device are secure. In some cases, the security interface generates a hash value or checksum based on contents of a file or image. The security interface may then compare the generated hash value or checksum with a reference value to validate an authenticity or security of the file or image.

At 606, boot media of the device is configured. In some cases, the boot includes volatile memory of a device, such as DRAM or SRAM as described herein. Configuring the boot media may include applying power to the boot media, flushing the boot media, configuring address ranges of the boot media, and the like. Alternately or additionally, configuring the boot media includes configuring the boot media to interface with a system bus or memory controller, such as a DMA-enabled memory controller.

At 608, a header image is loaded from non-volatile memory of the device. The header image can be loaded into the boot media or another volatile memory of the device from which the header image can be processed. In some cases, the header image is located at a predefined or default location of the non-volatile memory that is accessed responsive to the device starting up.

At 610, the header image is validated to ensure security of the contents of the header image. This can be effective to prevent execution of unauthorized commands, which may be configured to load alternate or insecure boot images into the boot media. In some aspects, a hash value is generated based on the code of the header image, which is then compared with a reference hash value to verify that the header image is secure. In cases in which the header image fails validation, the boot process the device can be halted or the device can be locked until a valid header image is loaded.

At 612, the header image is interpreted to construct commands and descriptors useful to boot the device. The commands may include a set of packed commands that are suitable for transmission to a memory controller and be configured to cause the memory controller to transfer multiple boot images. The descriptors may include ADMA descriptors that are configured to load multiple boot images into the boot media.

At 614, a boot image is loaded into the boot media from non-volatile memory, such as Flash memory or an eMMC device. In some cases, the boot image is sent by a memory controller of the non-volatile memory in response to execution of a first packed command. Alternately or additionally, the boot image can be loaded into the boot media via a DMA transfer operation in response to execution of a descriptor configured to implement the DMA operation. From operation 614, method 600 may proceed to operation 616 and to operation 618 in substantially parallel fashion.

At 616, it is determined whether another boot image is to be loaded from non-volatile memory. In some cases, this is indicated by the presence of another packed command awaiting execution. For example, the packed commands may include a sequence of READ_MULTIPLE_BLOCK commands configured to read multiple boot images. If another boot image is to be loaded from non-volatile memory, method 600 returns to operation 614, at which point a transfer operation of the other boot image is initiated. Note here that operations 614 and 616 may, independent of other concurrent operations of method 600 (e.g., 618 and 620), continue to repeat until any remaining boot images are loaded into the boot media.

At 618, the boot image in the boot media is validated to ensure security of the contents of the boot image. This can be effective to prevent execution of an unauthorized or insecure boot image, such as an image for operating system that permits malicious operations and programs. In some aspects, a hash value is generated based on the code of the boot image, which is and then compared with a reference hash value to verify that the boot image is secure. If the boot image fails validation, the boot process of the device can be halted or locked until another boot image is loaded. The validation of the boot image may be performed by a processor while a memory controller to loads a next boot image into the boot media. By so doing, various operation of the boot process can be parallelized, which may result in reduced boot times for the device.

At 620, it is determined whether another boot image in the boot media is to be validated. In some cases, this is indicated by an interrupt triggered in response to a descriptor completing execution or in response to completion of a DMA transfer operation. For example, at the end of descriptors execution by a memory controller, an interrupt may be triggered to alert the processor of another boot image's presence in the boot media. If another boot image in the boot media is to be validated, method 600 returns to operation 618, at which point a validation operation for the other boot image is initiated. Note here that operations 618 and 620 may, independent of other concurrent operations of method 600 (e.g., 614 and 616), continue to repeat until the remaining boot images in the boot media are validated. By so doing, various operation of the boot process can be parallelized, which may result in reduced boot times for the device. Once the boot images are validated, method 600 proceeds to operation 622.

At 622, the boot process transfers control of the device to one of the executing boot images. In some cases, control is transferred from a first executing boot image to a next executing boot image until control is transferred to an operating system of the device. By validating each successive boot image, a chain of trust is established throughout the boot process to ensure that unauthorized or malicious operating systems are prevented from executing on the device.

System-On-Chip

Figure 7:
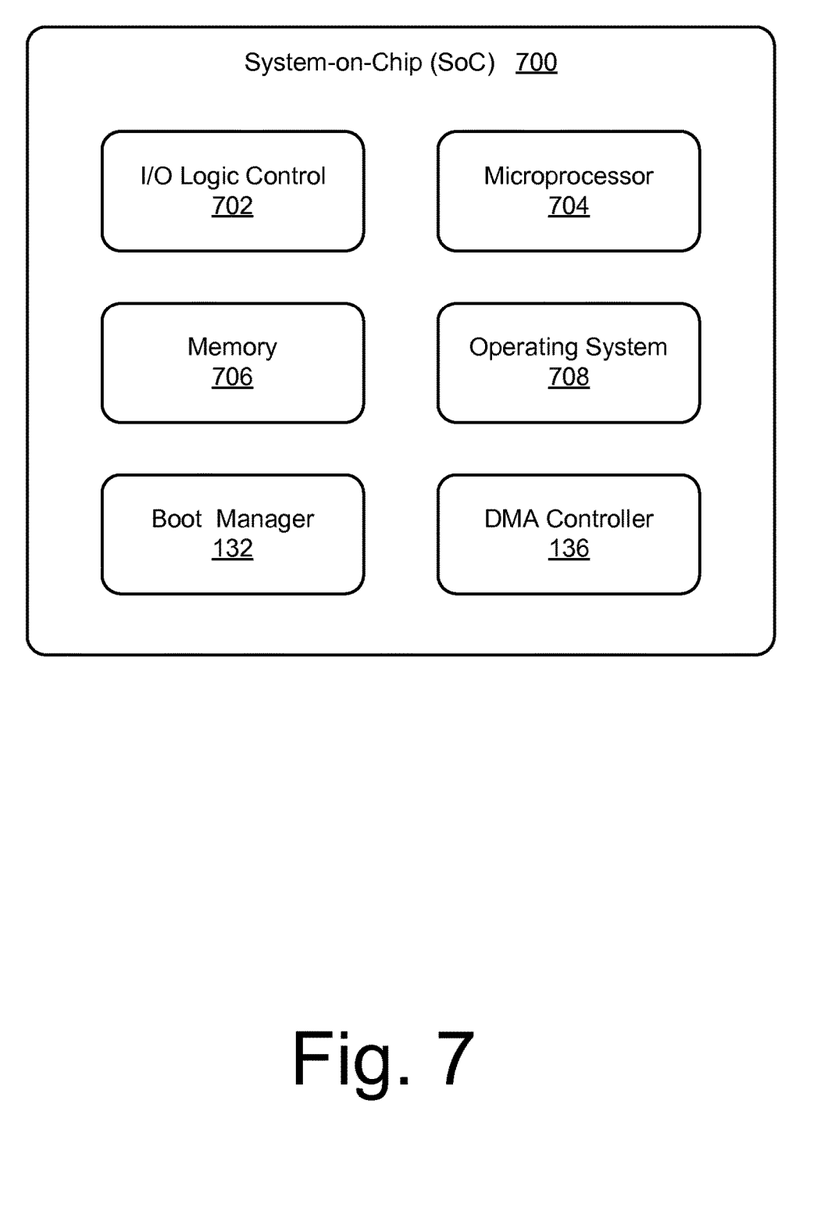
FIG. 7 illustrates a System-on-Chip (SoC) environment for implementing aspects of the techniques described herein.

FIG. 7 illustrates another example System-on-Chip (SoC) 700, which can implement various aspects of parallelizing boot operations. A SoC can be implemented in any suitable device, such as a video game console, IP-enabled television, smart-phone, desktop computer, laptop computer, access point, wireless router, cellular broadband router, tablet computer, server, network-enabled printer, set-top box, printer, scanner, camera, picture frame, home appliance, thermostat, home automation device, and/or any other type of electronic device.

SoC 700 can be integrated with electronic circuitry, a microprocessor, memory, input-output (I/O) logic control, communication interfaces, other hardware, firmware, and/or software needed to provide functionalities of a device, such as any of the above-listed devices. SoC 700 can also include an integrated data bus (not shown) that couples the various components of the SoC for data communication between the components. A memory storage device that includes SoC 700 can also be implemented with many combinations of differing components. In some cases, these differing components may be configured to implement concepts described herein over various internal or external data interfaces.

In this example, SoC 700 includes various components such as an input-output (I/O) logic control 702 (e.g., to include electronic circuitry) and microprocessor 704. SoC 700 also includes memory 706, which can be any type and/or combination of RAM, SRAM, DRAM, Flash, low-latency nonvolatile memory, ROM, one-time programmable (OTP) memory, and/or other suitable electronic data storage. Alternately or additionally, SoC 700 may comprise data interfaces (not shown) for accessing additional or external off-chip memory, such as external SRAM, DRAM, or Flash memory. Although not shown, the external memory (or memory 706) may include multiple non-volatile memory devices storing multiple respective portions of boot code or boot code images, as described with reference to FIG. 4. SoC 700 can also include various firmware and/or software, such as operating system(s) 708, which can be computer-executable instructions maintained by memory 706 and executed by microprocessor 704. SoC 700 may also include other various communication interfaces and components embodied as hardware, firmware, software, or any suitable combination thereof.

SoC 700 also includes boot manager 132 and DMA controller 136 (either of which may embodied as disparate or combined components). Examples of these various components, functions, and/or entities, and their corresponding functionality, are described with reference to the respective components of the environment 100 and various configurations as illustrated by FIGS. 2 and 4 (implemented as part of SD host controller 404). Boot manager 132, either independently or in combination with other entities (e.g., DMA controller 136), can be implemented as computer-executable instructions maintained by memory 706 and executed by microprocessor 704 to implement various embodiments and/or features described herein. Boot manager 132 may also be provided integral with other entities of the SoC, such as integrated a memory controller associated with memory 706 or another suitable software, firmware, or hardware component within SoC 700. Alternatively or additionally, boot manager 132 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
executing, responsive to receiving a packed command from a host driver implemented by a processor of a host device, the packed command effective to initiate reading of multiple boot images that are stored in a first memory of a memory device;
initiating, via a direct memory access (DMA) controller of the memory device and based on a first transfer descriptor of a set of transfer descriptors stored in a second memory of the host device, a first DMA transfer operation transferring a first boot image of the multiple boot images from the first memory of the memory device into the second memory of the host device, the first transfer descriptor configured to cause an interrupt responsive to completion of the first DMA transfer operation;
causing, via the interrupt and after completion of the first DMA transfer operation, initiation of a first validation operation by the processor of the host device to validate the first boot image in the second memory of the host device effective to verify that the first boot image is secure; and
initiating, via the DMA controller of the memory device, without waiting for completion of the first validation operation, and based on a second transfer descriptor of the set of transfer descriptors stored in the second memory of the host device, subsequent DMA transfer operations transferring at least a second boot image of the multiple boot images from the first memory of the memory device into the second memory of the host device, at least a portion of the subsequent DMA transfer operations occurring while the processor of the host device performs the first validation operation of the first boot image in the second memory of the host device.

2. The method as recited in claim 1, further comprising transferring, after completion of the first validation operation and validation operations for others of the multiple boot images, control to one of the multiple boot images.

3. The method as recited in claim 1, wherein the first validation operation comprises calculating a hash value for the first boot image and comparing the hash value with a predetermined reference value.

4. The method as recited in claim 1, wherein the first memory of the memory device includes a Flash memory and the second memory of the host device is a random-access memory (RAM).

5. The method as recited in claim 4, wherein the Flash memory comprises one of a serial peripheral interface (SPI) Flash memory, NAND Flash memory, embedded Flash memory, or a Flash memory of an embedded multimedia card (eMMC) device.

6. The method as recited in claim 1, wherein the multiple boot images are located in a same partition of the first memory of the memory device.

7. The method as recited in claim 1, wherein the memory device comprises an embedded multimedia card (eMMC) device.

8. The method as recited in claim 1, wherein the packed command enables the multiple boot images to be read from the first memory of the memory device without issuing individual read commands for each of the multiple boot images.

9. A method comprising:
retrieving, in response to a start of a boot sequence and via a processor of a host device, a header image from a non-volatile memory of a memory device, the header image describing multiple boot images stored in the non-volatile memory;
constructing, based on the header image and in a volatile memory of a host device, a packed command describing respective locations of the multiple boot images stored in the non-volatile memory of the memory device;
constructing, based on the header image and in the volatile memory of the host device, direct memory access (DMA) descriptors describing respective destination locations of the multiple boot images in the volatile memory of the host device, at least some of the DMA descriptors configured to cause an interrupt responsive to completing a DMA transfer of one of the multiple boot images as specified by the DMA descriptor; and
issuing the packed command to a memory controller of the memory device effective to cause the memory controller to:
initiate, via a DMA engine of the memory device and based on the DMA descriptors in the volatile memory of the host device, respective DMA transfers of the multiple boot images from the non-volatile memory of the memory device to the volatile memory of the host device; and
cause, via the interrupts caused by the DMA descriptors responsive to completing transfers of the multiple boot images into volatile memory of the host device, the processor of the host device to initiate respective validation operations of the multiple boot images, at least one of the respective DMA transfers transferring one of the multiple boot images while the processor of the host device validates a previously-transferred one of the multiple boot images.

10. The method as recited in claim 9, wherein the non-volatile memory is Flash memory and the packed command describes respective sizes of the multiple boot images and respective addresses of the multiple boot images in the Flash memory.

11. The method as recited in claim 9, wherein:
at least two of the DMA descriptors are configured as a chain of DMA descriptors;
the at least two of the DMA descriptors are associated with transferring one of the multiple boot images; and
a last DMA descriptor in the chain of DMA descriptors is configured to trigger an interrupt that indicates complete transfer of the one of the multiple boot images.

12. A System-on-Chip (SoC) comprising:
a processor configured to implement validation operations and other functionalities of a device;
a volatile memory configured to receive the multiple boot images;
an interface to a memory device that includes:
 (i) non-volatile memory configured to store multiple boot images; and
 (ii) a direct memory access (DMA) controller configured to enable access between the volatile memory of the SoC and the non-volatile memory of the memory device; and
a boot manager configured to:
 access a header image stored in the non-volatile memory of the memory device;
 interpret the header image to provide information describing respective sizes of the multiple boot images, or locations of the multiple boot images in the non-volatile memory, and destination locations for the multiple boot images in the volatile memory;
 construct, based on the header image, packed commands that specify the respective sizes of the multiple boot images and the locations of the multiple boot images in the non-volatile memory;
 construct, based on the header image, transfer descriptors that each specify a size of one of the multiple boot images and the destination location of the boot image in the volatile memory, the transfer descriptors including information that describes a DMA interrupt action associated with transferring each of the multiple boot images;
 issue the packed commands to the memory device effective to initiate reading of the multiple boot images from the non-volatile memory of the memory device;
 initiate, via the DMA controller and based on a first of the transfer descriptors, a first DMA transfer operation transferring a first of the multiple boot images from the non-volatile memory to the volatile memory;
 cause, in response to the first transfer descriptor triggering a first DMA interrupt indicating completion of the first DMA transfer operation of the first boot image to the volatile memory, the processor to initiate a validation operation to validate the first boot image in the volatile memory; and
 initiate, via the DMA controller, based on a second of the transfer descriptors, and without waiting for completion of the validation operation of the first boot image, a second DMA transfer operation transferring a second of the multiple boot images from the non-volatile memory to the volatile memory, at least a portion of the second boot image being transferred via the second DMA transfer while the processor performs the validation operation to validate the first boot image in the volatile memory.

13. The System-on-Chip as recited in claim 12, wherein the validation operation is a first validation operation and the boot manager is further configured to:
 cause, in response to the second transfer descriptor triggering a second DMA interrupt indicating completion of the second DMA transfer operation, the processor to initiate a second validation operation to validate the second boot image in the volatile memory; and
 transfer, after completion of the second validation operation, control of the device to the first boot image or the second boot image.

14. The System-on-Chip as recited in claim 12, wherein the boot manager is further configured to construct advanced DMA (ADMA) descriptors based on the information provided by the header image and cause the DMA controller to perform, based on the ADMA descriptors, the first and second DMA transfer operations.

15. The System-on-Chip as recited in claim 12, wherein the respective DMA transfer operations transfer the first and second boot images over an Advanced eXtensible Interface (AXI) bus, Advanced High Performance Bus (AHB), or Open Core Protocol (OCP) bus.

16. The System-on-Chip as recited in claim 12, wherein the DMA controller operates in compliance with version 4.5 of the Joint Electron Device Engineering Council (JEDEC) Embedded Multimedia Card (eMMC) standard.

17. The System-on-Chip as recited in claim 12, wherein the multiple boot images are stored in a same partition of the non-volatile memory.

18. The System-on-Chip as recited in claim 12, wherein the transfer descriptors are configured to cause the DMA controller to treat the respective DMA transfer operations of the first and second boot images as a single transfer.

19. The System-on-Chip as recited in claim 12, wherein the memory device comprises an embedded multimedia card (eMMC) device.

20. The System-on-Chip as recited in claim 12, wherein the packed commands reduce command overhead over the interface by enabling the multiple boot images to be read from the non-volatile memory of the memory device without issuing individual read commands for each of the multiple boot images.

* * * * *